United States Patent [19]

George

[11] Patent Number: 4,537,122
[45] Date of Patent: Aug. 27, 1985

[54] SKIN REMOVAL APPARATUS FOR ALMONDS

[75] Inventor: Kurudamanmil A. George, Levittown, Pa.

[73] Assignee: Proctor & Schwartz, Inc., Horsham, Pa.

[21] Appl. No.: 653,638

[22] Filed: Sep. 24, 1984

Related U.S. Application Data

[62] Division of Ser. No. 438,279, Nov. 1, 1982, Pat. No. 4,491,603.

[51] Int. Cl.$^3$ .............................................. A23N 5/08
[52] U.S. Cl. ........................................ 99/516; 99/528; 99/568; 99/584
[58] Field of Search ................. 99/483, 516, 518, 525, 99/528, 534, 536, 539, 540, 584, 568–570; 426/482, 481, 519; 34/57 A

[56] References Cited

U.S. PATENT DOCUMENTS

| 1,410,951 | 3/1922 | Park . | |
| 2,405,292 | 8/1946 | Curlee . | |
| 2,558,899 | 7/1951 | Green . | |
| 2,702,574 | 2/1955 | Green . | |
| 2,964,080 | 12/1960 | Gardner . | |
| 2,995,166 | 8/1961 | Burley et al. | 146/227 |
| 3,294,549 | 12/1966 | Vix et al. . | |
| 3,808,964 | 5/1974 | Barnes et al. | 99/518 |
| 3,874,279 | 4/1975 | Sakita et al. | 99/534 |
| 4,194,971 | 3/1980 | Beeckmans . | |
| 4,248,141 | 2/1981 | Miller, Jr. | 99/483 |
| 4,300,447 | 11/1981 | Hoover | 99/516 |
| 4,306,815 | 12/1981 | Majer et al. | 99/483 X |

Primary Examiner—Timothy F. Simone
Attorney, Agent, or Firm—Richard H. Thomas

[57] ABSTRACT

The present invention relates to a fluid bed process for the removal of skins from edible nuts.

10 Claims, 4 Drawing Figures

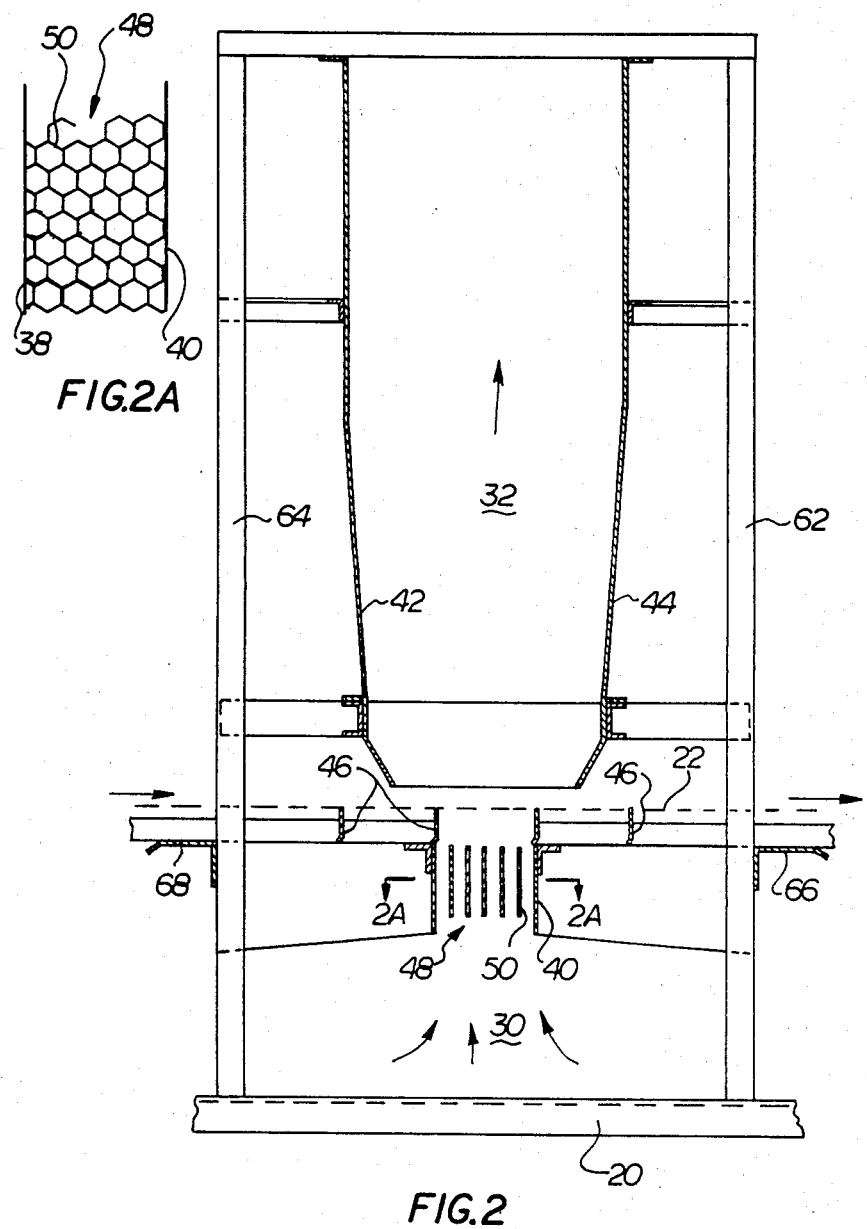

SKIN REMOVAL APPARATUS FOR ALMONDS

This is a division of application Ser. No. 438,279 filed Nov. 1, 1982, now U.S. Pat. No. 4,491,603.

The present invention relates to the removal of skins from edible nuts, and particularly to a process and apparatus for removal of the skins from almonds and other nuts wherein such removal is normally effected only with considerable difficulty.

BACKGROUND OF THE PRESENT INVENTION

U.S. Pat. No. 2,995,166 is illustrative of one process for removing skins from nuts, wherein the nuts are heated to loosen and crack the skins, followed by the use of air to blow the skins from the nuts. The nuts are trapped between a pair of porous moving belts, and air jets below the lower belt directed at the nuts causes the skin to be removed. The purpose of the upper belt is to hold the nuts on the lower belt against the air jet streams. The process of this patent is primarily for peanuts.

It is known to direct air jets downwardly onto a bed of nuts to dislodge the skins, collecting the skins in a cyclone or similar collection device through which the skins and treating air are passed. In the treatment of almonds, this step is preceded by a soaking step wherein the nuts are soaked in water or sodium hydroxide for about 8 hours. Washing removes all but about 5–10% of the skins. Subsequently, the nuts are then dried in a conveyor dryer to remove moisture from the nuts, the air jet apparatus of above being a part of this dryer, for the purpose of removing the remaining 5–10% of the skins.

A principal problem with this process is that the bed depth, because the air jets are directed downwardly, is limited to about 1 inch or so, limiting the capacity which the dryer can handle. This in turn adds unduly to the cost of the drying and skin removal operation. The problem is particularly evident with the removal of skins from almonds, due to the size, shape and density of these almonds, and generally tight adherence of the skins to the nut surfaces.

SUMMARY OF THE PRESENT INVENTION

The present invention constitutes an improvement in process for removing skins from edible nuts wherein the nuts are first soaked in a liquid to loosen the skins for removal of a majority of the skins by washing, the improvement for substantially completely separating the remaining skins from said nuts, which comprises the steps of fluidizing the nuts in a plurality of upwardly directed streams of a fluidizing medium while said nuts are still in a moistened condition, the fluidization separating the skins and nuts; entraining said skins in said fluidizing medium; and separating the skins from the fluidizing medium.

The present invention is particularly based on the discovery that the mass flow rate of fluidizing medium, necessary to fluidize the nuts, is surprisingly effective in removal of skins from the nut surfaces. In this regard, the present invention is especially applicable to the separation of the skins from nuts wherein said nuts are almonds.

In a preferred embodiment, the fluidizing medium contains an amount of moisture in excess of that in ambient air.

Also, in a preferred embodiment, the almonds are subjected to drying in a conveyor dryer subsequent to the soaking and washing step, the skin removal process being an intermediate step in the drying.

The present invention also resides in a novel apparatus for carrying out the above process, comprising; a housing; a moving conveyor belt within said housing; a means to form a bed of nuts on said conveyor belt; means to fluidize said bed with a fluidizing medium; and means to separate the skins entrained in the fluidizing medium from such medium.

In a preferred embodiment, the apparatus includes a confined passageway of small dimension in a lengthwise direction in said housing below and above the conveyor belt adapted to establish a high velocity flow of the fluidizing medium, said passageway below the belt containing a honeycomb grid structure dividing the passageway into a plurality of small uniformly sized upwardly directed subpassages, said passageway above the belt containing a plurality of spaced apart vanes extending parallel to the direction of movement of the conveyor belt adapted to restrain the fluidized bed of nuts from sideways movement and prevent channeling of the fluidizing medium in the bed.

The invention and its advantages will become more apparent from the following specification, with reference to the accompanying drawings, in which:

FIG. 2 is a slightly enlarged section view taken along line 2—2 of FIG. 1.

FIG. 2A is a further enlarged section view taken along line 2A—2A of FIG. 2.

Figure 1:
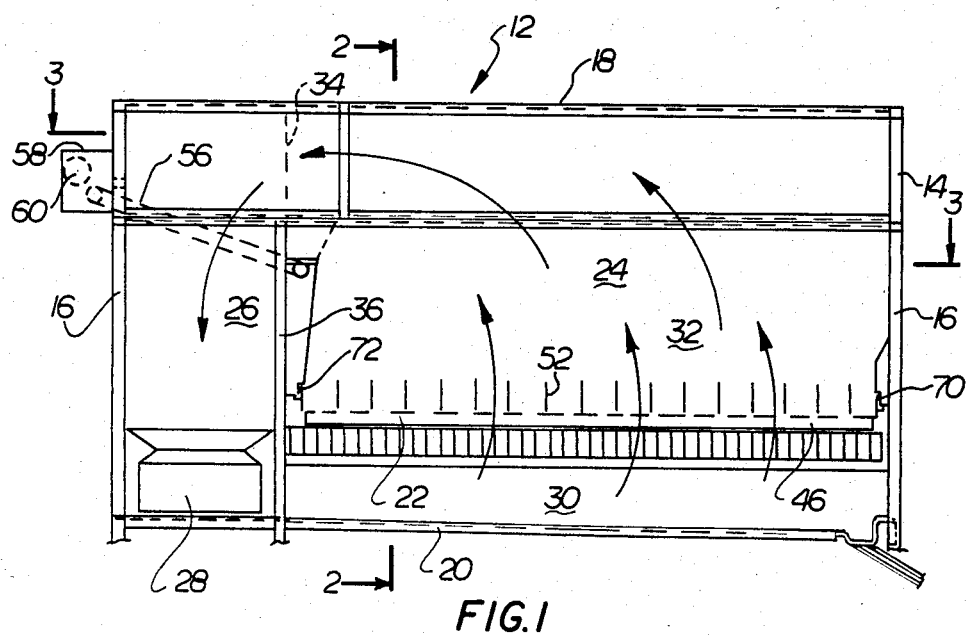
FIG. 1 is a section elevation view of a skin removal module incorporating the concepts of the present invention.

Referring to the drawings, the module 12, FIG. 1, of the present invention, comprises a housing 14 which is generally rectangular in shape comprising sides 16, roof 18 and floor 20. In practice, the almond nuts, which have been deshelled, are subjected to conventional soaking and washing steps which remove 90–95% of the skins. Following the soaking and washing steps, they are subjected to drying in a multi-stage dryer which includes a pre-drying section, and successive drying and cooling sections which are not shown. As is common in such dryers, a single foraminous conveyor extends longitudinally through the dryer, passing through all of the successive sections.

In accordance with the present invention, the skin-removal module is positioned immediately following the pre-drying section, and immediately before successive dryer sections and a cooler section. As will be later described, the dimensions of the skin-removal module, in terms of height and width, will be the same as those of the other dryer sections to provide an unbroken outer appearance. The conveyor in the skin-removal module is the same conveyor employed in the rest of the dryer.

Alternatively, if desired, the module of the present invention can be a separate unit, not integrally associated with a dryer or a part of a dryer. In this regard, the circulated air in the skin-removal module preferably is not heated, as contrasted with the dryer sections, permitting its use as a separate unit.

An advantage in positioning the skin removal module immediately after a conventional dryer pre-drying section is that the pre-drying section tends to remove superficial water making it easier for the remaining 5% of the skins to come off. However, it is important that the pre-drying be limited to a predetermined amount since if the almonds are dried too much, the skins tend to stick to the almonds and become difficult to remove.

Turning back to FIG. 1, the continuous, foraminous, belt conveyor is designated as item 22, as shown in dashed lines. Only the upper flight of the conveyor belt is shown, the belt moving longitudenly in the module (into the paper). The belt can be either fabric or metallic foraminous plates of conventional construction.

A return flight of the conveyor (not shown) passes beneath the housing floor 20 in a conventional fashion.

As shown in FIG. 1, the module housing is divided, right to left, into a right up-flow side 24 and a left down-flow recirculating side 26, the latter being in communication with the inlet side of a circulating fan 28 to circulate a fluidizing medium in the direction shown by the arrows in FIG. 1. Air under pressure is introduced into a lower plenum chamber 30 beneath the conveyor, flowing upwardly through the conveyor into an upper plenum chamber 32, and then through opening 34 formed in a divider wall 36 dividing the module into the respective left and right sides 24 and 26.

The right hand side of the module, containing the lower and upper chambers 30 and 32, is better shown in the cross section elevation view of FIG. 2. In this view, the conveyor belt 22 passes longitudinally through the up-flow side of the module, in the direction from left to right.

A critical aspect of the present invention is in having a high velocity flow of air or fluidizing medium contacting the bed of nuts on the conveyor belt 22, particularly where the nuts are almonds. This is accomplished by providing reduced cross sectional areas defined by lower, closely spaced apart baffles 38 and 40 below the conveyor belt, and upper, closely spaced apart baffles 42 and 44 above the conveyor belt 22; the latter defining a narrow, but long chimney extending across the width of the belt, spaced from the belt as shown. The lower baffles 38 and 40 extend upwardly into sealing relationship with grits 46 positioned in a conventional manner on the underside of conveyor belt 22. As shown in FIG. 1, the grits 46 extend the full width of the conveyor belt and in the direction of travel of the belt, are at spaced intervals of the underside of the belt. Their function is to strengthen the conveyor belt and prevent sagging under load.

The passageway 48 defined by the lower baffles 38 and 40, is packed with a honeycomb grid structure 50 shown in detail in the plan view of FIG. 2A, dividing the passageway into a large number of uniformly sized vertically extending sub-passages capable of directing the fluidizing medium against the underside of the conveyor belt 22 in the form of a large number of small, high velocity, jets rather than as a large swirling stream of air as in conventional passageways. By virtue of this structure, it is possible to load the conveyor belt with a bed depth (non-fluidized) of 3 to 5 inches, as contrasted with the conventional bed depth of about 1 inch to which units have heretofore been restricted. Other advantages of the honeycomb structure are that the fluidizing medium is directed uniformly at the underside of the belt 22, and leakage of air between the passageway 48 and the underside of the belt is minimized.

Figure 3:
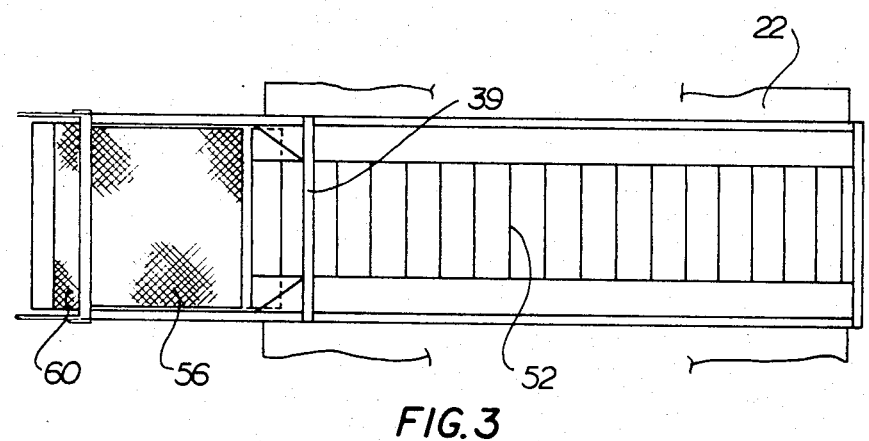
FIG. 3 is a top view taken along line 3—3 of FIG. 1.

An important aspect of the present invention resides in the use of a plurality of spaced apart longitudenly extending vanes 52 positioned in the lower end of passageway 32 defined by the upper baffles 42 and 44. These vanes are shown in all the drawings, and are illustrated most clearly in FIGS. 2 and 3. The vanes extend parallel to the direction of movement of the conveyor 22, and prevent sideways drifting or movement of the fluidized bed, and channeling of fluidizing medium in the bed.

By way of example, the skin removing module has an air flow velocity of about 800 to 1,600 feet per minute, contrasted with the rest of the dryer which may have an air flow velocity of about 200–300 feet per minute. The bed depth is about 3 to 5 inches. The fan unit 28 uses a 20 horse power motor giving an air movement of about 17,000 cubic feet per minute at about 5 inches Hg. standard pressure. By maintaining a narrow up flow space in the plenum chamber 32 above the conveyor, a high flow velocity is maintained to airborne the skins separated from the fluidized almonds.

Referring to FIG. 1, the skins are collected on a continuous belt screen 56 positioned in the down flow recirculating the side of the module across the area of flow of the fluidizing medium. The collecting belt screen travels in a counter clockwise direction conveying the collected skins to a collection chute 58 positioned outside of the dryer on the side 16 of the dryer. Doffer 60 in the collection housing removes skins from the screen 56 so that the skins drop to a suitable collection devise (not shown) beneath the doffer.

The module 12 is sealed, on the front and back sides 62 and 64, FIG. 2, which abut against other modules of the dryer apparatus, by laterally extending "L" shaped flange seals 66 and 68 secured to the sides 62 and 64, but spaced from the conveyor belt 22 so as to engage the grits 46 as they move in a left to right direction. The flange seals 66 and 68 are dimensioned so as to engage at least one girt at all times effectively sealing the opening through which the conveyor passes. Above and below the conveyor, suitable wall panels and a conventional aprons cooperate with the grit towards providing only an opening for passage of the conveyor belt thereby minimizing the flow of fluidizing medium from the module. Along the sides of the conveyor belt, a conventional seal arrangement, such as that shown in FIG. 1 and identified with the numbers 70 and 72 prevents the lateral flow of air from the pressure side of the module. The use of the honeycomb grid structure 50 beneath the dryer prevents excessive loss of fluidizing medium in this area.

Preferably the collecting belt screen 56 is a very fine screen of about 50 mesh. If the fluidizing medium is unheated, it is possible to use a polyester mesh screen, although if the medium is heated, a metal mesh screen would be preferred. An advantage of the use of a screen of the type illustrated in FIG. 1 is that it causes a lower pressure drop than a conventional cyclone separator. In addition, the light and fragile skins are likely to be plastered to the side of the cyclone clogging the cyclone eventually. In the present invention, the doffer continuously removes the skins from the collection screen.

The present invention is particularly applicable to the removal of skins from almond nuts. Almond nuts present a special problem for skin removal because of the irregular shape of the nuts and the fact that the skins are relatively tough and tightly adhered to the nut surfaces. It was found that the velocity of the air necessary to fluidize the nuts, which is quite high, on the order of 1000 feet per minute because of the density and the shape of almond nuts, was surprisingly effective in skin removal, wherein the skins were in a moist condition. Important in this respect is the use of a plurality of high speed jets to achieve fluidization, and vanes in the fluid bed to prevent excessive sideways movement of the nuts in the bed. The vanes also probably are effective is establishing a certain uniform amount of abrasion between the nuts, which contributes to skin removal. By the same token, the amount of abrasion was not found to be as great as to cause any destruction or breakage of the nuts.

What is claimed is:

1. Apparatus for removing skins from edible nuts comprising
   means for presoaking said nuts in a liquid to loosen the skins;
   means for washing the soaked nuts to remove a majority of said skins from the nuts, said nuts after washing having remaining skins;
   means for predrying said nuts in an amount effective to remove superficial water from the nuts;
   a housing;
   a foraminous support within said housing;
   means to form a bed of said predried nuts on said support;
   means to fluidize said bed with air; and
   means to separate the skins entrained in the air from such air.

2. Apparatus of claim 1 including means to recirculate the air medium in said housing.

3. Apparatus of claim 2 including air passageways above and below the support of narrow dimension in the direction of travel of the support further including a honeycomb structure in the passageway below the support adapted to direct a plurality of high velocity streams against the underside of the support.

4. Apparatus of claim 3 wherein said support is a moving conveyor belt and further including upright, spaced apart vanes positioned in the upper passageway, said vanes lying in planes parallel to the direction of movement of the conveyor belt and being adapted to prevent excessive sideways movement of nuts in the fluidized bed.

5. Apparatus of any of claims 1, 2, 3, or 4 including a movable screen above the support adapted to separate nut skins from the fluidizing medium.

6. Apparatus of claims 1, 2, 3, or 4 for removing skins from almond nuts.

7. The apparatus of claim 1 wherein said foraminous support is a conveyor belt.

8. Apparatus for removing skins from edible nuts comprising soaking means for soaking the nuts in a liquid to loosen the skins;
   washing means for washing the soaked nuts to remove a majority of said skins from the nuts, said nuts after washing containing remaining skins;
   fluidization means for forming a bed of said washed nuts and passing an upward stream of fluidizing air through said bed at a velocity sufficient to fluidize said bed and to substantially completely separate the remaining skins from said nuts;
   said nuts during fluidization having sufficient moisture to permit skin removal;
   said skins being entrained in said fluidizing medium after skin removal;
   further including means to separate said skins from the fluidizing medium.

9. Apparatus of claim 8 including a single foraminous conveyor means to convey said nuts successively through the soaking means, washing means and fluidization means.

10. Apparatus of claim 9 including drying means, said conveyor means conveying nuts from said fluidization means to and through said dryer means.

* * * * *

UNITED STATES PATENT AND TRADEMARK OFFICE
CERTIFICATE OF CORRECTION

PATENT NO. : 4,537,122
DATED : 8/27/85
INVENTOR(S) : Kurudamannil A. George

It is certified that error appears in the above-identified patent and that said Letters Patent are hereby corrected as shown below:

On the title page:
Under "Inventor" change "Kurudamanmil" to --Kurudamannil--

Signed and Sealed this

Third Day of December 1985

[SEAL]

Attest:

DONALD J. QUIGG

Attesting Officer

Commissioner of Patents and Trademarks